United States Patent [19]
Yoshino

[11] Patent Number: 4,848,850
[45] Date of Patent: Jul. 18, 1989

[54] ANTISKID CONTROL DEVICE

[75] Inventor: Masato Yoshino, Itami, Japan

[73] Assignee: Sumitomo Electric Industries, Ltd., Japan

[21] Appl. No.: 245,793

[22] Filed: Sep. 19, 1988

[30] Foreign Application Priority Data

Sep. 19, 1987 [JP] Japan ............................ 62-235926

[51] Int. Cl.$^4$ .......................... B60T 8/74; B60T 8/80
[52] U.S. Cl. ..................................... 303/97; 303/105; 364/426.02
[58] Field of Search ....................... 303/97, 95, 96, 98, 303/99, 105, 102, 103, 107, 108, 109, 110; 364/426; 188/181 A, 181 C

[56] References Cited

U.S. PATENT DOCUMENTS

| | | | |
|---|---|---|---|
| 3,026,148 | 3/1962 | Ruof | 303/97 |
| 3,499,689 | 3/1970 | Carp et al. | 303/97 |
| 3,604,760 | 9/1971 | Atkins | 303/97 |
| 3,606,493 | 9/1971 | Schlitz et al. | 303/94 |
| 3,674,318 | 7/1972 | Hickner et al. | 303/97 X |
| 3,716,273 | 2/1973 | Beyerlein | 303/97 |
| 3,850,480 | 11/1974 | Atkins | 303/97 |
| 4,193,642 | 3/1980 | Miller | 303/97 |
| 4,260,200 | 4/1981 | Brearley et al. | 303/97 |
| 4,269,454 | 5/1981 | White et al. | 303/97 |
| 4,672,547 | 6/1987 | Masaki et al. | 303/97 X |

*Primary Examiner*—Douglas C. Butler
*Attorney, Agent, or Firm*—Cushman, Darby & Cushman

[57] ABSTRACT

An antiskid control device including a first detector for outputting a first signal indicating that an acceleration of each of wheels of a motor vehicle has dropped below a first reference value into a deceleration region, a second detector for outputting a second signal indicating that the acceleration has exceeded a second reference value into an acceleration region during a first predetermined time interval after output of the first signal, a timer for starting counting of a second predetermined time interval at the moment of output of the second signal, a third detector for outputting a third signal indicating that the acceleration has dropped below a third reference value into the deceleration region and a restriction device for causing a braking pressure adjusting operation to be performed only while the third signal is being outputted by the third detector during actuation of the timer.

8 Claims, 4 Drawing Sheets

ANTISKID CONTROL DEVICE

BACKGROUND OF THE INVENTION

The present invention relates to an antiskid control device which prevents loss of directional stability or controllability of a motor vehicle due to locking of wheels at the time of braking and ensures a minimum braking distance.

Conventionally, in control of a braking pressure in antiskid control devices for motor vehicles, it has been generally so arranged that when locking of wheels has been detected at the time of braking on the basis of a slip speed identical with a difference between a vehicle speed and a wheel speed, a braking pressure is reduced so as to recover the wheel speed to such a level as to obtain a proper slip speed such that not only locking of wheels is prevented but a braking distance is minimized.

However, the known antiskid control devices have such a drawback that when the braking pressure has been reduced upon detection that the wheels trend towards locking, the braking pressure may be frequently reduced excessively owing to methods of decision of pressure reduction or delay in actuation of a braking system. In such a case, since a braking force becomes too small, rotation of the wheels recovers rapidly beyond a proper slip state up to a level approximate to the vehicle speed and thus, the braking distance is increased if no countermeasure is taken.

Thus, if a command of increasing the braking pressure is issued upon detection of recovery of rotation of the wheels, the proper slip state is brought about at last. At this time, in the known antiskid control devices, a state of the wheels trending towards locking again in response to increase of the braking pressure after recovery of the wheels from locking is detected by such a criterion that an acceleration of the wheels has dropped below a predetermined acceleration reference value $\alpha 1$ into a deceleration region. Meanwhile, the acceleration of the wheels may drop below the predetermined acceleration reference value $\alpha 1$ into the deceleration region also while the wheels whose rotation has recovered to the vehicle speed are being shifted to the proper slip state. Thus, in this case, since it is decided that the wheels have trended towards locking, antiskid control such as pressure reduction against a symptom of locking of the wheels is performed. As a result, such an inconvenience is incurred that the braking pressure cannot be increased at the time when the braking pressure is actually required to be increased so as to recover a braking force.

As described above, such an undesirable phenomenon takes place after the wheels have been recovered from locking rapidly due to the excessively small braking force. Thus, in order to eliminate the undesirable phenomenon, a method is considered in which when the wheels are accelerated beyond a predetermined acceleration reference value $\alpha 2$ at the time of recovery of the wheels from locking, new detection of locking of the wheels is subsequently prohibited during a predetermined time period. However, this method is also disadvantageous in that even when the wheels have actually trended towards locking again due to an exceedingly large value of the braking pressure after rapid recovery of rotation of the wheels, a control action for avoiding locking of the wheels cannot be started until the predetermined time period elapses.

SUMMARY OF THE INVENTION

Accordingly, an essential object of the present invention is to provide, with a view to eliminating the above described disadvantages inherent in the conventional antiskid control devices, an antiskid control device which is capable of positively detecting and making a decision on locking of wheels of a motor vehicle without oversensitive response to rapid deceleration occurring temporarily in the case where a braking pressure is increased after rotation of the wheels has completely recovered from locking through reduction of the braking pressure upon detection of locking of the wheels or rapid acceleration and deceleration are repeated temporarily during running of the motor vehicle on a bumpy road.

In order to accomplish this object of the present invention, an antiskid control device for a motor vehicle, embodying the present invention includes a first detection means for outputting, upon detection that an acceleration of each of wheels of the motor vehicle has dropped below a first acceleration reference value into a deceleration region, a first signal indicative of the detection of said first detection means, said antiskid control device, when the first signal has been outputted by said first detection means, deciding that the wheels trend towards locking and performing a braking pressure adjusting operation of adjusting a braking pressure for the purpose of preventing rise of the braking pressure, said antiskid control device comprising: a second detection means which outputs, upon detection that the acceleration has exceeded a second acceleration reference value different from the first acceleration reference value into an acceleration region during a first predetermined time interval after the first signal was outputted by said first detection means, a second signal indicative of the detection of said second detection means; a timer means which starts counting of a second predetermined time interval at the moment when the second signal has been outputted by said second detection means; a third detection means which outputs, upon detection that the acceleration has dropped below a third acceleration reference value different from the first and second acceleration reference values into the deceleration region, a third signal indicative of the detection of said third detection means; and a restriction means which causes the braking pressure adjusting operation to be performed only while the third signal is being outputted by said third detection means during actuation of said timer means.

In the antiskid control device of the present invention having the above described arrangement, when the braking pressure is increased again after recovery of the wheels from locking so as to restore the wheels to a proper slip state, rise of the braking pressure is prevented only if the acceleration of each of the wheels has dropped below the third acceleration reference value $\alpha 3$ different from the first acceleration reference value $\alpha 1$ into the deceleration region during the preset time interval of the timer means after detection by the second detection means that the acceleration has exceeded the second acceleration reference value $\alpha 2$. Therefore, in accordance with the present invention, it becomes possible to avoid oversensitive response to temporary deceleration within a range in which the wheel acceleration has dropped below the first acceleration reference value $\alpha 1$ into the deceleration region but does not drop below the third acceleration reference value $\alpha 3$ into the deceleration region. Furthermore, in the case where the wheels have trended towards locking actually, locking of the wheels can be detected at the time when the wheel acceleration has dropped below the third acceleration reference value α3 into the deceleration region.

In order to satisfy the above described requirements, the third acceleration reference value α3 can be set as a constant. Alternatively, in order to detect actual locking of the wheels as early as possible, it can also be so arranged that the third acceleration reference value α3 is set as a function of time so as to be severer than the first acceleration reference value α1 immediately after rapid acceleration of the wheels and assumes a value identical with that of the first acceleration reference value α1 upon lapse of the preset time interval of the timer means. In this case, decision criteria of locking of the wheels, which are, respectively, employed during the preset time interval of the timer means and after lapse of the preset time interval of the timer means, can be continued smoothly.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the accompanying drawings.

DETAILED DESCRIPTION OF THE INVENTION

Figure 1:
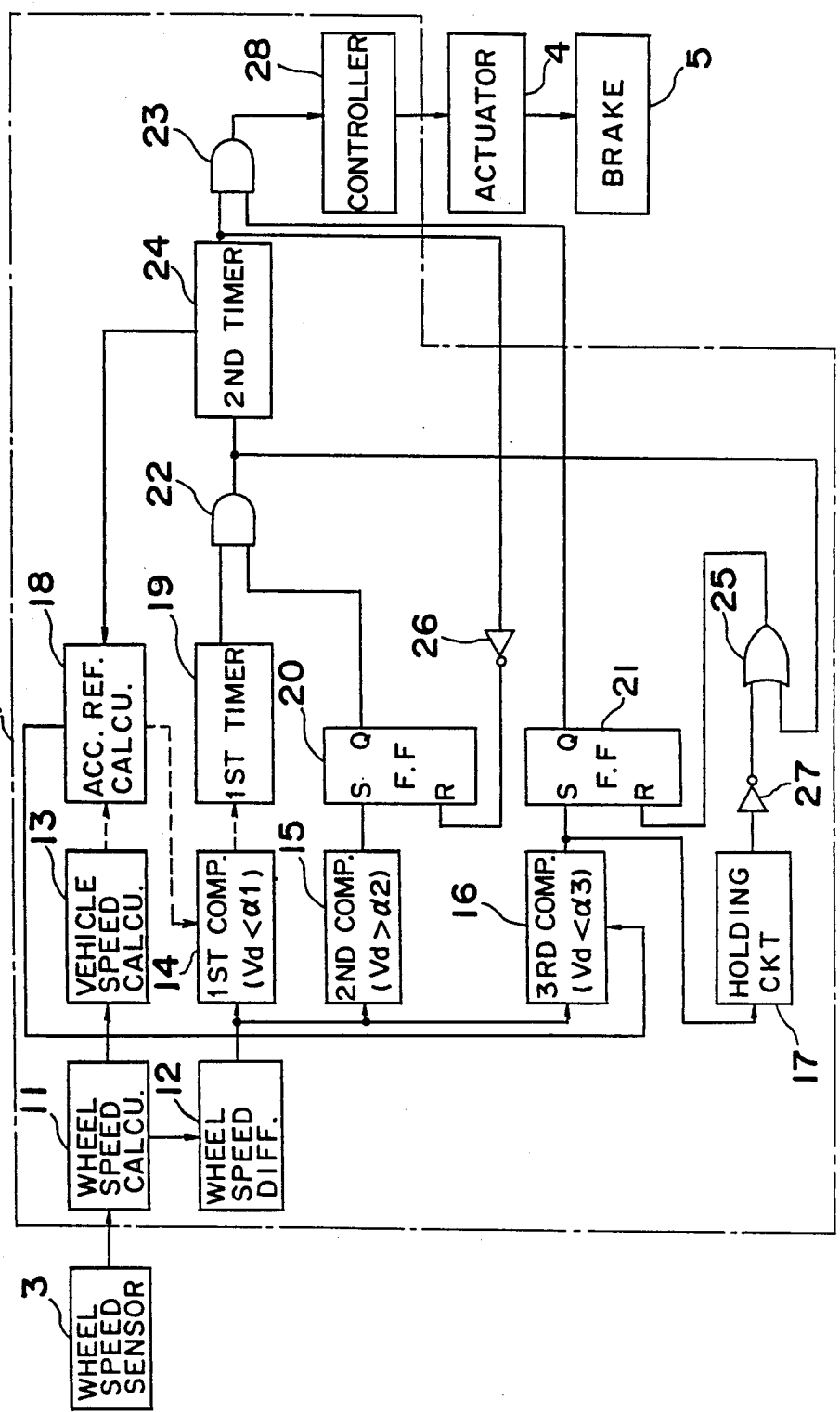
FIG. 1 is a block diagram showing a main construction of an antiskid control device according to one embodiment of the present invention.

Referring now to the drawings, there is shown in FIG. 1, an antiskid control device 1 according to one embodiment of the present invention. The antiskid control device 1 includes a wheel speed calculating means 11 for calculating a wheel speed Vw of each of wheels of a motor vehicle on the basis of an output of a wheel speed sensor 3 for each of the wheels, a wheel speed differentiating means 12 for differentiating the wheel speed Vw so as to obtain an acceleration Vd (a deceleration when the value is negative) of each of the wheels, a vehicle speed calculating means 13 for calculating a vehicle speed Vv on the basis of the wheel speed Vw, a first comparator 14 for comparing the wheel acceleration Vd with a first acceleration reference value α1 so as to act as a first detection means, a second comparator 15 for comparing the wheel acceleration Vd with a second acceleration reference value α2 so as to act as a second detection means and a third comparator 16 for comparing the wheel acceleration Vd with a third acceleration reference value α3 so as to act as a third detection means.

Furthermore, the antiskid control device 1 includes a holding circuit 17 for holding an output of the third comparator 16 for a predetermined time period, e.g. an interval of one control cycle, an acceleration reference calculating circuit 18 for calculating the third acceleration reference value α3, a first timer 19 which starts counting of a predetermined time interval T1 in response to an output of the first comparator 14, a first flip-flop 20, a second flip-flop 21, a first AND circuit 22, a second AND circuit 23, a second timer 24 which starts counting of a predetermined time interval T2 in response to an output of the first AND circuit 22, an OR circuit 25, NOT circuits 26 and 27 and a braking pressure controller 28 which issues to a braking pressure control actuator 4 for actuating a brake 5 of each of the wheels, commands of increasing, reducing or holding a braking pressure on the basis of a decision made by a result of the predetermined calculations.

The antiskid control device 1 is operated as follows. The first, second and third comparators 14, 15 and 16 compare the wheel acceleration Vd, which is calculated, for example, at each control cycle by the wheel speed differentiating means 12, with the first, second and third acceleration reference values α1, α2 and α3, respectively and generate output pulses when Vd<α1, Vd>α2 and Vd<α3, respectively.

Meanwhile, in this embodiment, a relation of (α2>0->α1>α3) is satisfied. The third acceleration reference value α3 is given as a function of time t and is expressed, for example, by the following equation (1):

$$\alpha 3(t) = -A3 + (T2-t) \times (-A1+A3)/T2 \quad (1)$$

where A1 is an absolute value of the first acceleration reference value α1 and A3 is an initial value (constant) of α3(t).

The third acceleration reference value α3 is calculated by the acceleration reference calculating circuit 18, which receives a content Tc2 of the second timer 24 as time t, so as to be inputted to the third comparator 16. At the time of t=0, namely when the second timer 24 has counted the predetermined time interval T2, a relation of (α3(0)=−A1) is obtained and thus, the third acceleration reference value α3 assumes a value identical with that of the first acceleration reference value α1.

Figure 2:
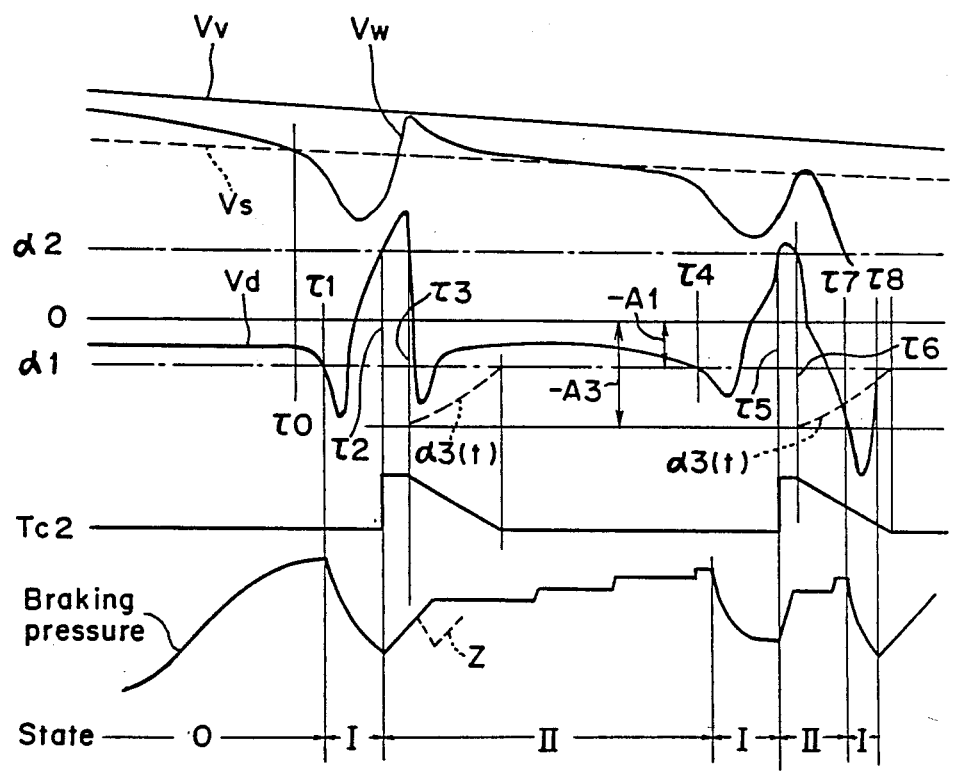
FIG. 2 is a graph explanatory of operation of the antiskid control device of FIG. 1.

When a driver kicks a brake pedal during running of the motor vehicle and thus, antiskid control is started, a state 0 mode for only increasing the braking pressure is initially carried out. As shown in FIG. 2, when the braking pressure is being increased continuously, the wheel speed Vw and the vehicle, speed Vv decrease. At a time point τ0, the wheel speed Vw drops below a lower limit speed Vs of an optimum slip speed range and thus, the wheels exhibit a symptom of locking. When the driver continuously kicks the brake pedal until a time point τ1 with consequent rise of the braking pressure, the wheel acceleration Vd drops below the first wheel acceleration reference value α1 into a deceleration region. Hence, the predetermined time interval T1 is preset in the first timer 19 by the output pulse of the first comparator 14 such that the first timer 19 starts time counting. At the same time, antiskid control is shifted to a state I mode in which the braking pressure is reduced and held in combination. During actuation of the first timer 19, the first timer 19 outputs a signal T1on.

If the wheel acceleration Vd exceeds the second acceleration reference value α2 into an acceleration region as a result of reduction of the braking pressure while this signal T1on is being outputted by the first timer 19, namely during the predetermined time interval T1 from the time point τ1, i.e. after the wheel acceleration has dropped below the first wheel acceleration reference value α1 into the deceleration region (for example, during an interval from a time point $\tau_2$ to a time point $\tau_3$ in FIG. 2), the second comparator 15 generates the output pulse, so that the first flip-flop 20 is set such that a "Q" output of the first flip-flop 20 is turned on. Therefore, since an output signal St of the first AND circuit 22 is turned on, the predetermined time interval T2 is preset in the second timer 24 such that the second timer 24 starts time counting. During actuation of the second timer 24, the second timer 24 outputs a T2on signal. The first flip-flop 20 is reset, for example, in response to rise of the signal T2on through the NOT circuit 26. As described above, the second timer 24 can be arranged to start time counting at the time point $\tau_2$ when the wheel acceleration Vd exceeds the second acceleration reference value $\alpha 2$ into the acceleration region. It can also be so arranged that the second timer 24 starts time counting at the time point $\tau_3$ when the wheel acceleration Vd subsequently drops below the second acceleration reference value $\alpha 2$ again. Needless to say, if the output pulse is not generated by the second comparator 15 during the predetermined time interval T1 after generation of the output pulse of the first comparator 14, namely if a relation of (Vd>$\alpha 2$) is not obtained, time counting of the second timer 24 is not started.

When time counting of the second timer 24 is started, antiskid control is shifted to a state II mode in which the braking pressure is increased and held in combination. On the other hand, during actuation of the second timer 24, the acceleration reference calculating circuit 18 receives a content Tc2 of the second timer 24 and calculates the third acceleration reference value $\alpha 3(t)$ by using the equation (1) referred to earlier so as to set the obtained third acceleration reference value $\alpha 3(t)$ in the third comparator 16 every moment. When the wheel acceleration Vd has dropped below the third acceleration reference value $\alpha 3$ into the deceleration region, i.e. Vd<$\alpha 3$ while the signal T2on is being generated by the second timer 24, namely during the predetermined time interval T2 after start of time counting of the second timer 24 when the wheel acceleration Vd has exceeded the second acceleration reference value $\alpha 2$ into the acceleration region, the third comparator 16 generates the output pulse so as to set the second flip-flop 21 such that a "Q" output of the flip-flop 21 is turned on. However, since a relation of (Vd>$\alpha 3$) is established during the predetermined time interval T2 from the time point $\tau_3$ (or $\tau_2$), the second flip-flop 21 is not set.

However, the wheel acceleration Vd subsequently drops below the first acceleration reference value $\alpha 1$ into the deceleration region at a time point $\tau_4$ and then, exceeds the second acceleration reference value $\alpha 2$ into the acceleration region during an interval from a time point $\tau_5$ to a time point $\tau_6$ such that the second timer 24 is turned on. At a time point $\tau_7$, since a relation of (Vd<$\alpha 3$) is established in a state where the second timer 24 is in the ON state, the Q output of the second flip-flop 21 is turned on. It is to be noted that the second flip-flop 21 has been reset in response to rise of the output signal St of the first AND circuit 22. Thus, since the second flip-flop 21 is turned on while the signal T2on is being generated by the second timer 24, the second AND circuit 23 is turned on, so that a signal Con is supplied from the second AND circuit 23 to the braking pressure controller 28. This signal Con is held until a time point $\tau_8$ when the relation of (Vd>$\alpha 3$) is created. At the time point $\tau_8$, an output level of the holding circuit 17 which holds, for the interval of one control cycle, the output of comparison of the previous control cycle of the third comparator 16 rises, the second flip-flop 21 is reset through the NOT circuit 27 and the OR circuit 25 such that the Q output of the second flip-flop 21 is turned off, so that the output signal Con of the second AND circuit 23 is also turned off.

The signal Con is a signal for commanding an operation of adjusting the braking pressure for the purpose of preventing rise of the braking pressure in the braking pressure controller 28. When this signal Con is being held, antiskid control is changed over to, for example as shown in FIG. 2, the state I mode in which the braking pressure is reduced and held in combination.

Thus, in the present invention, even if the wheel acceleration has merely dropped below the first acceleration reference value $\alpha 1$ into the deceleration region at the time when the braking pressure is increased again in order to obviate lack of the deceleration of each of the wheels because the wheel acceleration exceeded the second acceleration reference value $\alpha 2$ into the acceleration region by reduction of the braking pressure after the wheels had trended towards locking, the operation of adjusting the braking pressure for the purpose of preventing rise of the braking pressure is not performed. For example, in FIG. 2, an operation Z (shown by the broken lines) of reducing the braking pressure is not performed after the time point $\tau_3$. Namely, in the present invention, only when the wheel acceleration is lower than the third acceleration reference value $\alpha 3$ different from the first acceleration reference value $\alpha 1$ so as to fall in the deceleration region during the predetermined time interval after the wheel acceleration has exceeded the second acceleration reference value $\alpha 2$ into the acceleration region, the above described operation of adjusting the braking pressure for the purpose of preventing rise of the braking pressure is performed. Accordingly, antiskid control can be performed without oversensitive response to occurrence of the temporary deceleration within a range in which the wheel acceleration has dropped below the first acceleration reference value $\alpha 1$ into the deceleration region but does not drop below the third acceleration reference value $\alpha 3$ into the deceleration region. Furthermore, when the wheels have trended towards locking actually, locking of the wheels is positively detected by the third acceleration reference value $\alpha 3$ and thus, an operation for recovering the wheels from locking can be started at an early stage.

Meanwhile, as described above, since the third acceleration reference value $\alpha 3$ is set as a function of time so as to not only be severer than the first acceleration reference value $\alpha 1$ immediately after rapid acceleration of the wheels but assume a value identical with that of the first acceleration reference value $\alpha 1$ upon lapse of the predetermined time interval T2, decision criteria of locking of the wheels, which are, respectively, employed during the predetermined time interval T2 and after lapse of the predetermined time interval T2, can be continued smoothly.

Meanwhile, in the above described embodiment, the third acceleration reference value $\alpha 3$ is set as a function of time. However, it can also be so arranged as shown by the broken lines in FIG. 1 that the vehicle speed Vv is inputted from the vehicle speed calculating means 13 to the acceleration reference calculating circuit 18 such that both of the first and third acceleration reference values $\alpha 1$ and $\alpha 3$ are properly set as functions of the vehicle speed Vv by the acceleration reference calculating circuit 18.

Figure 3A:
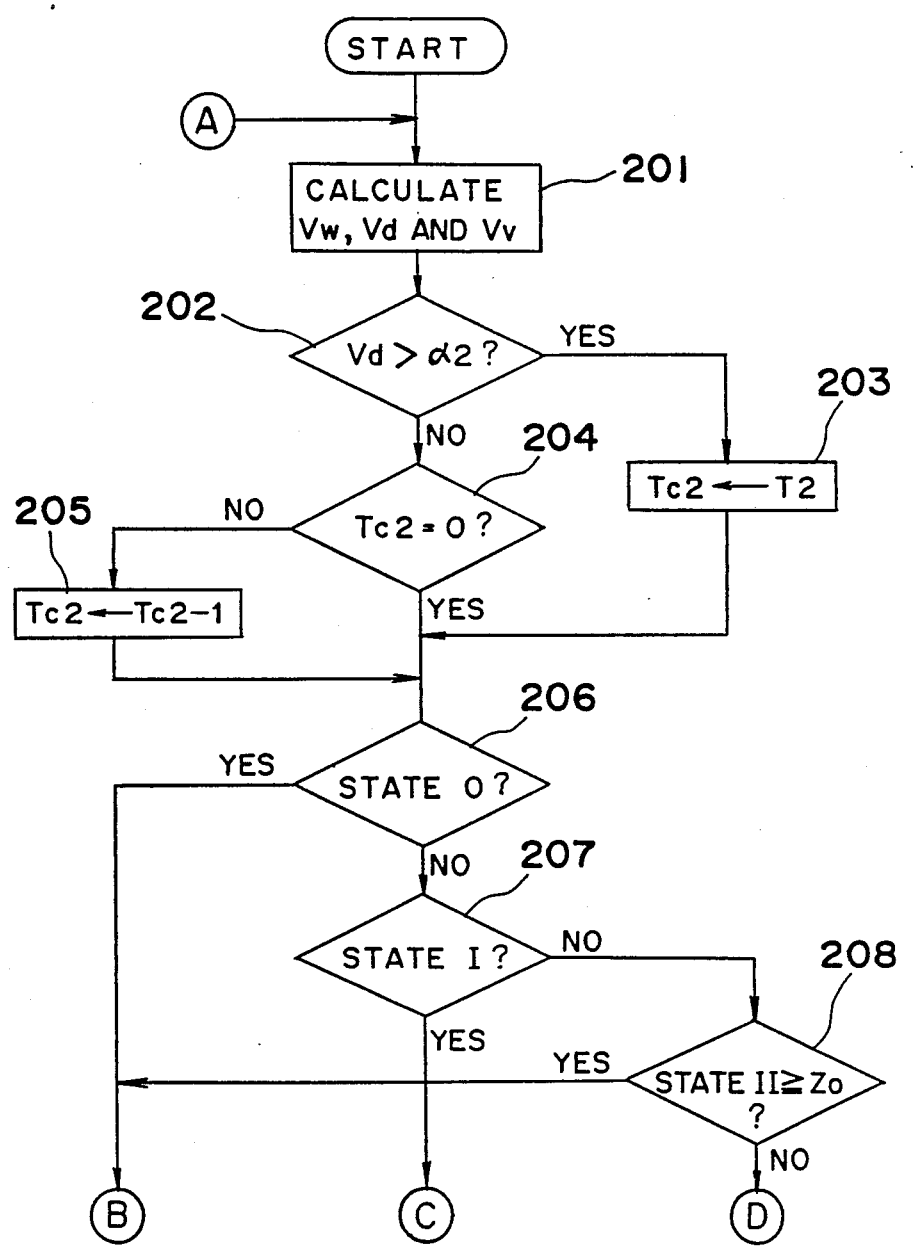
FIGS. 3a and 3b are flow charts of a processing sequence of the antiskid control device of FIG. 1.
Figure 3B:
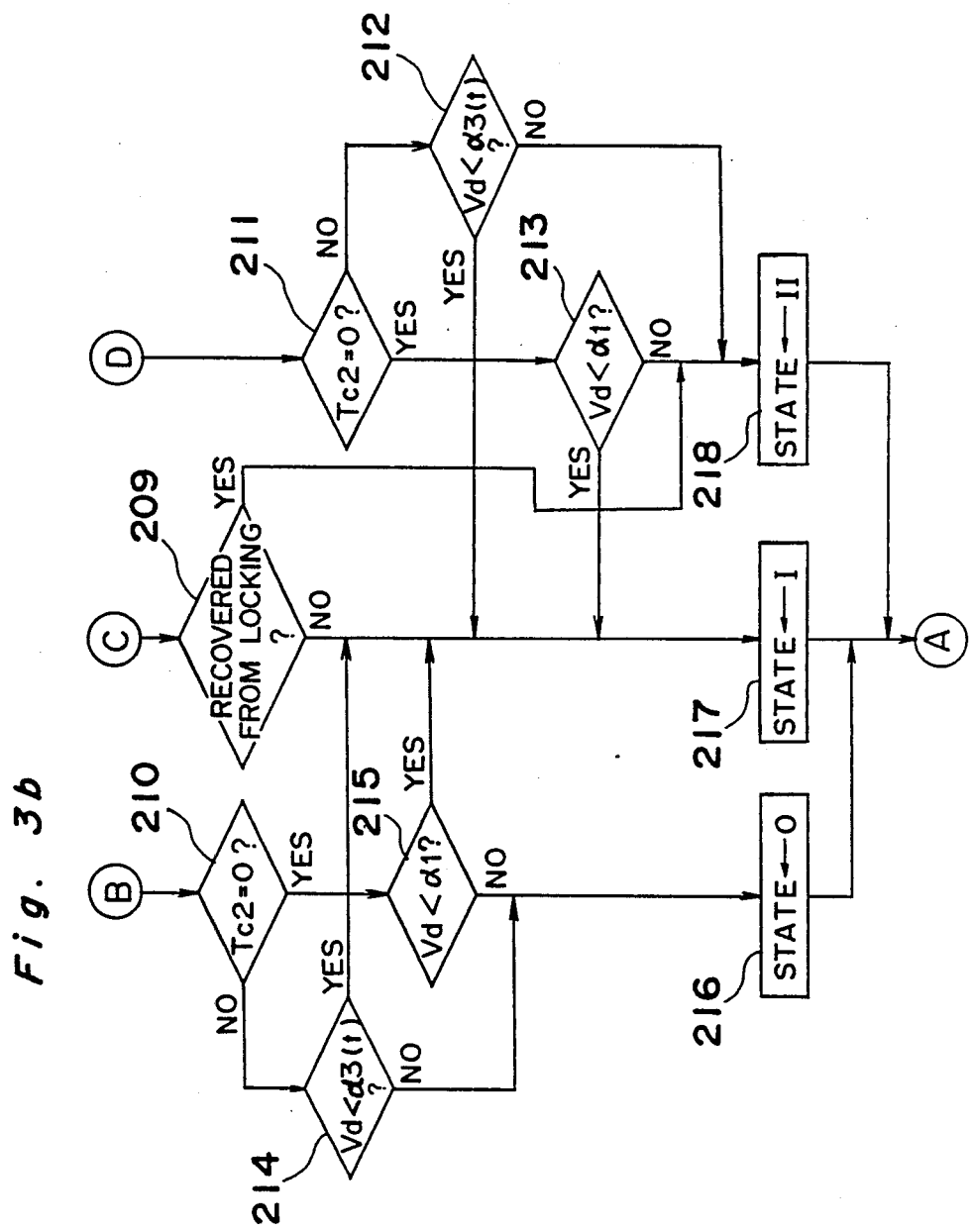

The above described control operation of the antiskid control device 1 can be performed by a microcomputer by using a program shown by flow charts of FIGS. 3a and 3b. At step 201, the microcomputer calculates the wheel speed Vw, the wheel acceleration Vd and the vehicle speed Vv at each control cycle. Then, at step 202, it is decided whether or not the wheel acceleration Vd is larger than the second acceleration reference value $\alpha 2$. In the case of "NO" at step 202, it is decided at step 204 whether or not the content Tc2 of the second timer 24 is zero. In the case of "NO" at step 204, namely when the second timer 24 is being actuated in response to "YES" at step 202 in the previous or earlier control cycle, "1" is reduced from the content Tc2 of the second timer 24 at step 205. On the other hand, in the case of "YES" at step 204, the program flow proceeds to step 206. Meanwhile, in the case of "YES" at step 202, namely when the wheel acceleration Vd exceeds the second acceleration reference value $\alpha 2$ into the acceleration region, the predetermined time interval T2 is preset in the second timer 24 so as to start the second timer 24 at step 203 leading to step 206.

At step 206, it is decided whether or not antiskid control is set to the state 0 mode for only increasing the braking pressure. In the case of "YES" at step 206, the program flow proceeds to step 210. On the contrary, in the case of "NO" at step 206, it is decided at step 207 whether or not antiskid control is set to the state I mode for reducing and holding the braking pressure in combination. In the case of "NO" at step 207, namely if antiskid control is set to the state II mode for increasing and holding the braking pressure in combination, the program flow proceeds to step 208. Meanwhile, in the case of "YES" at step 207, the program flow proceeds to step 209.

At step 209, a decision is made as to whether or not the wheels have recovered from locking. In the case of "NO" at step 209, antiskid control is held in the state I mode at step 217 and then, the program flow returns to step 201. On the other hand, in the case of "YES" at step 209, antiskid control is set to the state II mode at step 218 and then, the program flow returns to step 201. Meanwhile, at step 208, it is decided whether or not the state II mode satisfies a predetermined condition Zo that the state II mode is held for not less than a predetermined time period or the braking pressure has been increased not less than a predetermined number of times. In the case of "YES" at step 208, the program flow proceeds to step 210. On the other hand, in the case of "NO" at step 208, the program flow proceeds to step 211.

At step 211, a decision is made as to whether or not the content Tc2 of the second timer 24 is equal to zero. In the case of "NO" at step 211, namely when the second timer 24 is being actuated, the program flow proceeds to step 212 at which it is decided whether or not the third acceleration reference value $\alpha 3(t)$ is larger than the wheel acceleration Vd. On the contrary, in the case of "YES" at step 211, the program flow proceeds to step 213 at which it is decided whether or not the first acceleration reference value $\alpha 1$ is larger than the wheel acceleration Vd. In the case of "YES" at step 212, namely when the wheel acceleration Vd drops below the third acceleration reference value $\alpha 3(t)$ into the deceleration region, antiskid control is set to the state I mode at step 217 and then, the program flow returns to step 201. In the case of "NO" at step 212, the program flow returns, through step 218, to step 201.

Meanwhile, in the case of "YES" at step 213, the program flow proceeds to step 217 for setting antiskid control to the state I mode and then, returns to step 201. On the other hand, in the case of "NO" at step 213, antiskid control is held in the state II mode at step 218 and then, the program flow returns to step 201.

In the case of "YES" at step 206 or in the case of "YES" at step 208, the program flow proceeds to step 210 at which the content Tc2 of the second timer 24 is equal to zero. In the case of "NO" at step 210, namely when the second timer 24 is being actuated, the program flow proceeds to step 214 at which it is decided whether or not the third acceleration reference value $\alpha 3(t)$ is larger than the wheel acceleration Vd. On the other hand, in the case of "YES" at step 210, the program flow proceeds to step 215 at which it is decided whether or not the first acceleration reference value $\alpha 1$ is larger than the wheel acceleration Vd. In the case of "YES" at step 214, the program flow proceeds to step 217 for setting antiskid control to the state I mode and then, returns to step 201. In the case of "NO" at step 214, antiskid control held in the state 0 mode at step 216 and then, returns to step 201.

Meanwhile, in the case of "YES" at step 215, antiskid control is set to the state I mode at step 217 and then, the program flow returns to step 201. On the other hand, in the case of "NO" at step 215, antiskid control is held in the state 0 mode at step 216 and then, the program flow returns to step 201.

As is seen from the foregoing description, the antiskid control device of the present invention is capable of positively detecting locking of the wheels at an early stage without oversensitive response to rapid deceleration temporarily appearing also in the case where either the braking pressure is increased during antiskid control after rotation of the wheels has completely recovered from locking by reducing the braking pressure or rapid acceleration and deceleration are temporarily repeated during running of the motor vehicle on a bumpy road. Accordingly, in accordance with the present invention, it will be apparent that performances of an antiskid brake system employing the antiskid control device of the present invention are greatly improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An antiskid control device for a motor vehicle, including a first detection means for outputting, upon detection that an acceleration of each of wheels of the motor vehicle has dropped below a first acceleration reference value into a deceleration region, a first signal indicative of the detection of said first detection means, said antiskid control device, when the first signal has been outputted by said first detection means, deciding that the wheels trend towards locking and performing a braking pressure adjusting operation of adjusting a braking pressure for the purpose of preventing rise of the braking pressure, said antiskid control device comprising:

a second detection means which outputs, upon detection that the acceleration has exceeded a second acceleration reference value different from the first acceleration reference value into an acceleration region during a first predetermined time interval after the first signal was outputted by said first detection means, a second signal indicative of the detection of said second detection means;

a timer means which starts counting of a second predetermined time interval at the moment when the second signal has been outputted by said second detection means;

a third detection means which outputs, upon detection that the acceleration has dropped below a third acceleration reference value different from the first and second acceleration reference values into the deceleration region, a third signal indicative of the detection of said third detection means; and a restriction means which causes the braking pressure adjusting operation to be performed only while the third signal is being outputted by said third detection means during actuation of said timer means.

2. An antiskid control device as claimed in claim 1, wherein the third acceleration reference value is a function of time so set as to assume a value identical with that of the first acceleration reference value upon lapse of the second predetermined time interval.

3. An antiskid control device as claimed in claim 1, wherein the braking pressure adjusting operation is constituted by a combination of reduction and holding of the braking pressure.

4. An antiskid control device as claimed in claim 2, wherein the braking pressure adjusting operation is constituted by a combination of reduction and holding of the braking pressure.

5. An antiskid control device as claimed in claim 1, wherein the first and third acceleration reference values are functions of a speed of a vehicle body of the motor vehicle, respectively.

6. An antiskid control device as claimed in claim 2, wherein the first an third acceleration reference values are functions of a speed of a vehicle body of the motor vehicle, respectively.

7. An antiskid control device as claimed in claim 3, wherein the first and third acceleration reference values are functions of a speed of a vehicle body of the motor vehicle, respectively.

8. An antiskid control device as claimed in claim 4, wherein the first and third acceleration reference values are functions of a speed of a vehicle body of the motor vehicle, respectively.

* * * * *